Figure 1:
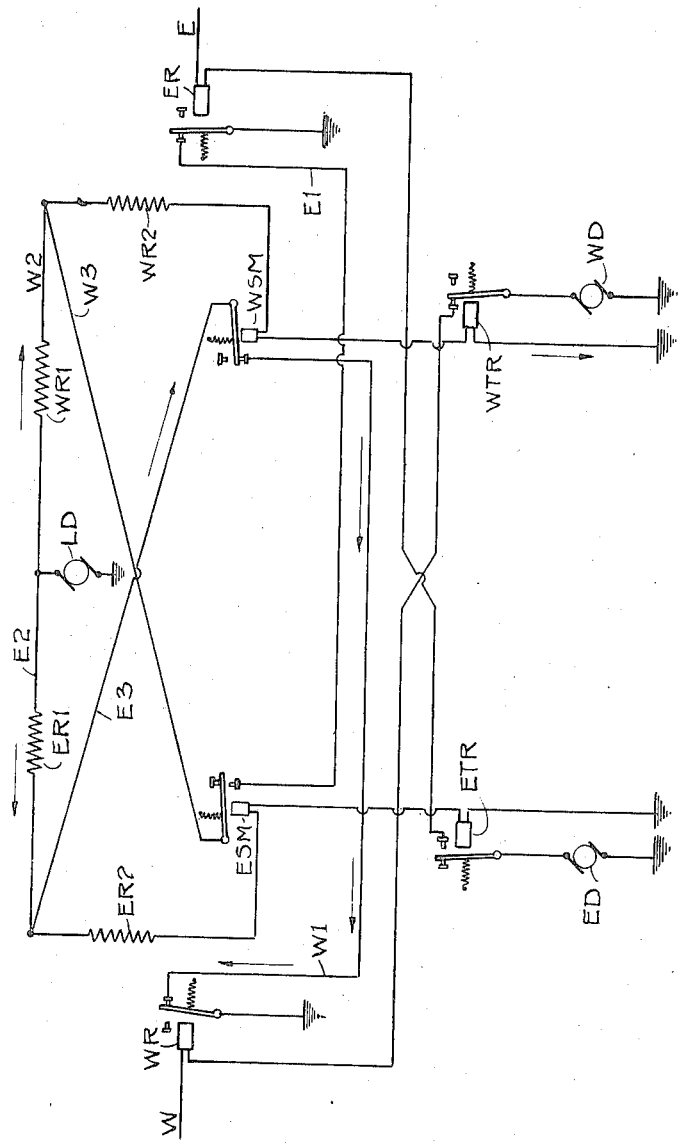

W. FINN.
TELEGRAPH REPEATER.
APPLICATION FILED FEB. 3, 1915.

1,164,274.

Patented Dec. 14, 1915.
2 SHEETS—SHEET 1.

Attest:

Inventor:
William Finn
by H. M. Marble Atty

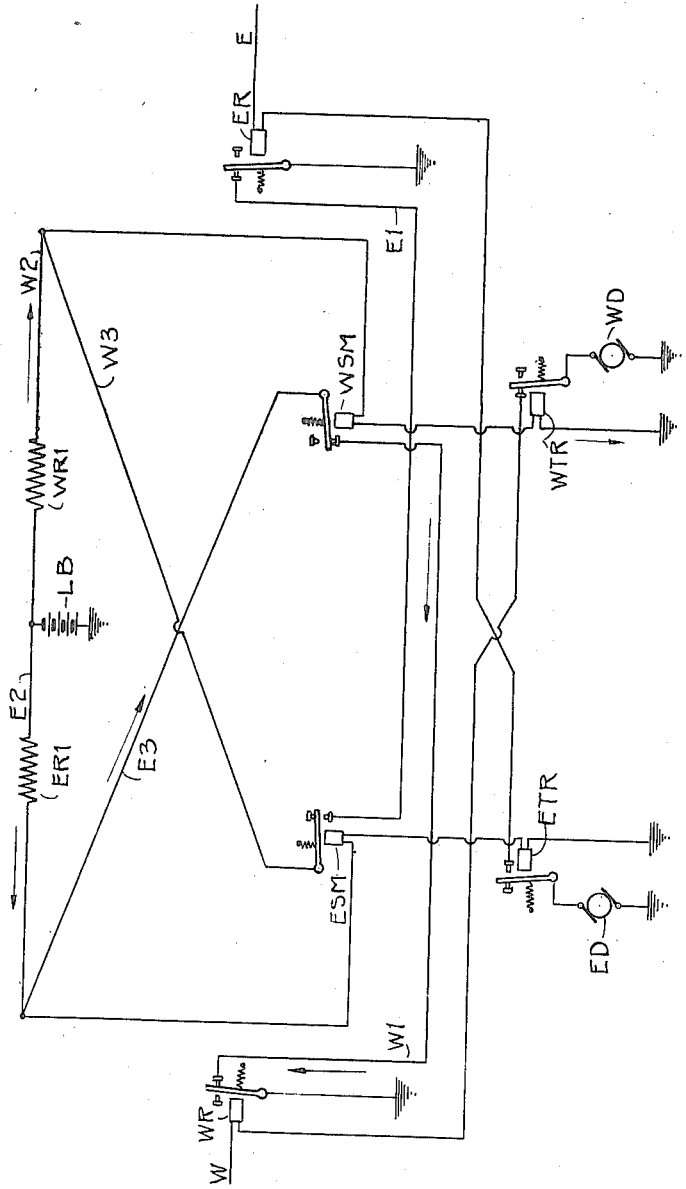

UNITED STATES PATENT OFFICE.

WILLIAM FINN, OF BLOOMFIELD, NEW JERSEY, ASSIGNOR TO THE WESTERN UNION TELEGRAPH COMPANY, OF NEW YORK, N. Y., A CORPORATION OF NEW YORK.

TELEGRAPH-REPEATER.

1,164,274.  Specification of Letters Patent.  Patented Dec. 14, 1915.

Application filed February 3, 1915. Serial No. 5,872.

*To all whom it may concern:*

Be it known that I, WILLIAM FINN, a citizen of the United States of America, and a resident of Bloomfield, in the county of Essex and State of New Jersey, have invented certain new and useful Improvements in Telegraph-Repeaters, of which the following is a specification.

My invention relates to improvements in telegraph repeaters and particularly to that type thereof known as "back contact" repeaters, and comprises improvements whereby a higher speed of operation and more certain transmission, particularly under adverse operating conditions, are obtained.

My invention consists in the use, in connection with the repeating transmitters, of separate shunt relays of lower speed of operation than the repeating transmitters; and in other features, all as hereinafter described and particularly pointed out in the appended claims.

The object of my invention is to provide a simple repeater giving higher speeds of operation and giving better signals, particularly under adverse operating conditions, than is the case with respect to former repeaters adapted for the same service.

I will now proceed to describe my invention with reference to the accompanying drawings, illustrating my repeater diagrammatically, and will then point out the novel features in claims.

In said drawings: Figure 1 is a diagram of my repeater arranged for the supply of local current by a dynamo generator; Fig. 2 is a similar diagram illustrating my repeater arranged for the supply of local current by a battery.

Referring first to Fig. 1, E and W designate incoming lines and ER and WR designate line relays. ETR and WTR designate repeating transmitters. ED and WD designate line generators adapted for supplying current to lines E and W respectively, and LD designates a local generator supplying current for the operation of the local circuits and instruments of the repeater. ESM and WSM designate shunt relays. The repeating transmitters ETR and WTR, and the corresponding relays ER and WR are high speed instruments, which in practice are adjusted similarly, as nearly as may be done conveniently; while the shunt relays ESM and WSM are, preferably, arranged to operate slower than the corresponding transmitting relays ETR and WTR when a marking signal is to be repeated, and to operate quicker than said transmitting relays when a spacing signal is to be repeated.

The circuits are as follows: Each main line, E or W, as the case may be, after passing through its corresponding line relay ER or WR, passes to the front contact of the corresponding transmitting relay, ETR or WTR; the armatures of said transmitting relays being connected, through the corresponding generators ED or WD, to ground or other return. The back stops of the two line relays ER and WR are each connected by a conductor $E^1$ or $W^1$, to the front contact stop of the corresponding shunt relay ESM or WSM. From local generator LD, a circuit conductor $E^2$ extends, through resistance $ER^1$ and $ER^2$, to the magnet of the corresponding shunt relay ESM and then through the magnet of the corresponding transmitting relay ETR to ground or other suitable return; and from a point intermediate the two resistances $ER^1$ and $ER^2$ a branch conductor $E^3$ extends to the armature of the opposite shunt relay WSM. There are corresponding circuit conductors $W^2$ and $W^3$, and corresponding resistances $WR^1$ and $WR^2$, from generator LD to the magnets of shunt relay WSM and transmitting relay WTR, and the armature of shunt relay ESM.

The particular object of each of the shunt relays ESM or WSM is to close or open, at the proper times, a short circuit around the opposite transmitting relay at such times as it is required that the local current be diverted from, or permitted to pass through, the magnet of the opposite transmitting relay. When, for example, the W line is opened, the local current must be shunted from the transmitter ETR, so that this transmitter may open the E line and so repeat the space signal of the W line into the E line; while, on the other hand, under such condition, the magnet of the W line transmitter WTR, must be kept energized, in order to preserve the integrity of the W line at the points of the transmitter WTR through which that particular line is led.

The operation of the repeater is as follows: Supposing transmission to be in progress from the W line to the E line, and supposing both of these lines to be closed, the armatures of the line relays, WR and ER, will be against their front stops, and current from the local generator LD will be passing through the magnets of shunt relays WSM and ESM and through the magnets of the transmitting relays WTR and ETR holding the armatures of these four relays against their front stops. Suppose now that the W line be opened for the transmission of a spacing signal. The armature of line relay WR will then be retracted, and when it closes contact with its rear stop, a circuit will be completed from local generator LD through conductor $E^2$, resistance $ER^1$, conductor $E^3$, the front stop of shunt relay WSM, conductor $W^1$ and the rear stop of relay WR to return, thereby diverting current from the magnets of relays ESM and ETR, i. e., shunting such magnets, and so deënergizing them. It is desirable that relay ESM shall, at this time, break contact at its front contact stop more quickly than relay ETR breaks contact at this time with its front contact stop; and such is in fact the case, and cannot well be otherwise, for since relay ESM is less sensitive and requires a stronger current to hold its armature against its front stop than does relay ETR, the current through the magnets of these two relays, in dying down, reaches a value permitting the armature of relay ESM to leave its front stop, before it reaches a value permitting the armature of relay ETR to leave its front stop. When the front contact of relay ESM is broken the connection from the rear stop of relay ER to local generator LD is broken. Meanwhile, the local current from generator LD continues to flow through the magnets of relays WSM and WTR, and by keeping these instruments firmly closed with what may be termed a "holding current", prevents all possibility of "kicking" or "rattling" on the part of the repeater during the process of signaling. When the W line is closed again in order to send a marking signal, the armature of relay WR is attracted toward its front stop, and as soon as it starts forward the shunt around the magnets of relay ESM and ETR is broken, these magnets being immediately energized by the local current from generator LD, and as soon as the armature of relay ETR reaches its front stop it closes the E line, thereby repeating the marking signal into the E line. It is highly important that, at this time, the armature of relay ER (now resting against its back contact stop) should break away therefrom before the armature of relay ESM can reach its front stop; otherwise the local current from generator LD would pass through the front contact of relay ESM and the rear contact of relay ER to ground, shunting the magnets of relays WSM and WTR, momentarily breaking the W line and causing the repeater to "kick". Trouble of this kind, in former repeaters, has been of frequent occurrence in wet weather when the main line relays are "pulled way up", and are, consequently, much slower in acquiring the magnetic condition of strength required to draw their armatures away from their rear stops. But such difficulty is avoided in the present repeater; for, the transmitting relays ETR and WTR (the magnets of which are not subject to line conditions) being fast relays, while the shunt relays ESM and WSM are slow relays, it follows that relay ER will surely break contact of its armature with its rear stop before the slower acting relay ESM can close contact between its armature and front stop.

In the practical use of this repeater it has been found that once the several relays have been properly adjusted, no subsequent adjustment to meet varying line conditions is required. Of course the ordinary inspection and cleaning of contact points, with occasional readjustment to compensate for wear of the contact points, is required. But in the case of former repeaters, it has often been necessary with varying atmospheric conditions along one or the other of the W and E lines, for a repeater attendant to exercise almost constant supervision over the repeater, adjusting and readjusting the repeater as line conditions vary. A rain storm in a region through which one or the other of the W and E lines passes, of course produces more or less leakage; which leakage will be variable as the length of the line subject to such leakage varies, and may also vary from other conditions. For each such material variation readjustment of the repeater has been necessary. Moreover, it frequently happens that a branch transmitting circuit is connected to one or the other of the W and E lines; and there may be a rain storm between the distant end of the W line and the point at which that W line is tapped to connect with the branch transmitting station. The repeater having been adjusted for transmission from the distant end of the W line, (that line being affected, it will be supposed, by a rain storm beyond the point where the W line is supposed to be tapped), if now transmission begins from the branch line, into the repeater, there being no rain storm affecting the line from the branch station to the repeater, a completely new adjustment is required, with former repeaters. But it has been found in practice that, with this repeater herein illustrated and described, no such readjustment is required under such conditions. For the repetition of signals from the W line into the E line, it is necessary only that the armature of the relay WR make and break contact with its rear stop. It is easy to provide main line relays which will do this, under the most adverse weather conditions. In practice, the repeater herein illustrated and described has operated satisfactorily and at high speed when the currents flowing through the magnet of the incoming main line relay were too feeble to cause the armature of that relay to reach its front stop; the armature merely making and breaking contact with its back stop; and even under such adverse conditions the signals repeated into the outgoing line were practically as perfect as under the best operating conditions. Furthermore, because for the operation of this repeater only making and breaking of contact with the rear stop of the incoming line main line relay is required, the repeated current impulses are much longer than in the case of repeaters operating by the making and breaking of contact with the front stops of the main line relays; for the local repeating apparatus begins the marking signal as soon as contact with the back stop of the main line relay is broken, such marking signal continuing until contact with that back stop is closed again; whereby there results a prolongation of the local action, with consequent "solidification" of signals, and increase in permissible rate of speed of operation.

In practice 150 ohm relays have been employed for the line relays and transmitting relays, and 50 ohm relays have been employed for the shunt relays; resistances $ER^1$, $WR^1$ and $ER^2$ and $WR^2$ have been of about 150 ohms each; but of course I do not limit myself to these particular resistance values; and of course the several resistances $ER^1$, $WR^1$, $ER^2$ and $WR^2$ may be adjustable. The current in the local circuits including the magnets of the shunt relays (also termed, in certain of the following claims, auxiliary relays) and the magnets of the corresponding repeating transmitters, is customarily reduced by means of the resistances shown to approximately 50 mil-amperes.

With instruments of the resistance values mentioned above, and with normal adjustment of the apparatus, about 35 mil-amperes is commonly required to properly actuate the shunt relays, whereas no more than 20 mil-amperes is generally required to operate the corresponding repeating transmitters; hence, with the same amount of current flowing through the magnets of the shunt relays, and the repeating transmitters, the magnetism in the transmitter magnet has only to rise to a fractional part of its final value before the corresponding armature is attracted to its front stop. When this occurs, the main line circuit is reëstablished through the coils of the main line relay of the line served by that transmitter, the armature of that main line relay breaking contact with its back stop long before the armature of the shunt relay has had time to reach its front stop and interfere with the local current of the opposite transmitter. From this it is evident that the initial regulation of the local apparatus need only be such as to cause the repeating transmitter to be operated on a low adjustment, and the shunt relays on a comparatively high adjustment, in order to insure the successful working of the repeater through the greatest range of weather variations, and without any alteration in the original adjustment of those instruments, in accordance with varying weather conditions.

If a local current supply of sufficiently high voltage is available, the local circuit branches containing the repeatig transmitters and shunt relays are given a very low time constant by the insertion of the relatively high non-inductive resistances $ER^2$ and $WR^2$ in order to increase the speed at which the repeater is capable of operating. But if the available source of local current supply is of relatively low voltage (for example, if it is a primary battery) it is generally impracticable for economical reasons to use these non-inductive resistances $ER^2$ and $WR^2$. In order to indicate that these resistances $ER^2$ and $WR^2$ may be omitted if desired, I have shown, in Fig. 2, a repeater, exactly corresponding with the repeater shown in Fig. 1, except that the resistances $ER^2$ and $WR^2$ are omitted, and except that a low voltage generator (primary battery LB) is shown for the supply of current for the local circuits.

What I claim is:—

1. A telegraph repeater comprising a repeating transmitter and a line relay for each of a plurality of main line circuits, in combination with an auxiliary relay corresponding to each transmitter, and local circuits whereby each main line relay controls the transmitter and auxiliary relay of the opposite line, and whereby each main line relay coöperates with the corresponding auxiliary relay to cause operation of the repeating transmitter of the opposite line when such main line relay is operated.

2. A telegraph repeater comprising a repeating transmitter and a line relay for each of a plurality of main line circuits, in combination with an auxiliary relay corresponding to each transmitter, and local circuits whereby each main line relay controls the transmitter and auxiliary relay of the opposite line, and whereby each main line relay coöperates with the corresponding auxiliary relay to cause operation of the repeating transmitter of the opposite line when such main line relay is operated, the auxiliary relays being less sensitive than the corresponding repeating transmitters and line relays.

3. A telegraph repeater comprising a repeating transmitter and a line relay for each of a plurality of main line circuits, in combination with an auxiliary relay corresponding to each transmitter, and local circuits, including controlling circuits passing through back contacts of the line relays, whereby each main line relay controls the transmitter and auxiliary relay of the opposite line, and whereby each main line relay coöperates with the corresponding auxiliary relay to cause operation of the repeating transmitter of the opposite line when such main line relay is operated.

4. A telegraph repeater comprising a repeating transmitter and a line relay for each of a plurality of main line circuits, in combination with an auxiliary relay corresponding to each transmitter, and local circuits, including controlling circuits passing through back contacts of the line relays, whereby each main line relay controls the transmitter and auxiliary relay of the opposite line, and whereby each main line relay coöperates with the corresponding auxiliary relay to cause operation of the repeating transmitter of the opposite line when such main line relay is operated, the auxiliary relays being less sensitive than the corresponding repeating transmitters and line relays.

5. A telegraph repeater comprising a repeating transmitter and a line relay for each of a plurality of main line circuits, in combination with an auxiliary relay corresponding to each transmitter, and local circuits, and a source of current supply therefor, said circuits including the magnet of each auxiliary relay in circuit with the magnet of the corresponding repeating transmitter, said local circuits further comprising circuits whereby each such auxiliary relay and the corresponding line relay are arranged to jointly close a shunt circuit around the magnets of the opposite auxiliary relay and repeating transmitter.

6. A telegraph repeater comprising a repeating transmitter and a line relay for each of a plurality of main line circuits, in combination with an auxiliary relay corresponding to each transmitter, and local circuits, and a source of current supply therefor, said circuits including the magnet of each auxiliary relay in circuit with the magnet of the corresponding repeating transmitter, said local circuits further comprising circuits whereby each such auxiliary relay and the corresponding line relay are arranged to jointly close a shunt circuit around the magnets of the opposite auxiliary relay and repeating transmitter, the auxiliary relays being less sensitive than the corresponding repeating transmitters and line relays.

7. A telegraph repeater comprising a repeating transmitter and a line relay for each of a plurality of main line circuits, in combination with an auxiliary relay corresponding to each transmitter, and local circuits, and a source of current supply therefor, said circuits including the magnet of each auxiliary relay in circuit with the magnet of the corresponding repeating transmitter, said local circuits further comprising circuits passing through rear contacts of the line relays whereby each such auxiliary relay and the corresponding line relay are arranged to jointly close a shunt circuit around the magnets of the opposite auxiliary relay and repeating transmitter.

8. A telegraph repeater comprising a repeating transmitter and a line relay for each of a plurality of main line circuits, in combination with an auxiliary relay corresponding to each transmitter, and local circuits, and a source of current supply therefor, said circuits including the magnet of each auxiliary relay in circuit with the magnet of the corresponding repeating transmitter, said local circuits further comprising circuits passing through rear contacts of the line relays whereby each such auxiliary relay and the corresponding line relay are arranged to jointly close a shunt circuit around the magnets of the opposite auxiliary and repeating transmitter, the auxiliary relays being less sensitive than the corresponding repeating transmitters and line relays.

9. A telegraph repeater comprising a repeating transmitter and a line relay for each of a plurality of main line circuits, in combination with an auxiliary relay corresponding to each transmitter, and local circuits, including a source of current supply, including the magnet of each auxiliary relay in circuit with the magnet of the corresponding repeating transmitter, and including front contacts of each auxiliary relay in circuit with rear contacts of the corresponding line relay.

10. A telegraph repeater comprising a repeating transmitter and a line relay for each of a plurality of main line circuits, in combination with an auxiliary relay corresponding to each transmitter, and local circuits, including a source of current supply, including the magnet of each auxiliary relay in circuit with the magnet of the corresponding repeating transmitter, and including front contacts of each auxiliary relay in circuit with rear contacts of the corresponding line relay, the auxiliary relays being less sensitive than the corresponding repeating transmitter and line relays.

11. A telegraph repeater comprising a repeating transmitter and a line relay for each of a plurality of main line circuits, in combination with an auxiliary relay corresponding to each transmitter, and local circuits, including a source of current supply, including the magnet of each auxiliary relay in circuit with the magnet of the corresponding repeating transmitter, and including front contacts of each auxiliary relay in circuit with rear contacts of the corresponding line relay, the last mentioned local circuits being in shunt relation with respect to the first mentioned local circuits.

12. A telegraph repeater comprising a repeating transmitter and a line relay for each of a plurality of main line circuits, in combination with an auxiliary relay corresponding to each transmitter, and local circuits, including a source of current supply, including the magnet of each auxiliary relay in circuit with the magnet of the corresponding repeating transmitter, and including front contacts of each auxiliary relay in circuit with rear contacts of the corresponding line relay, the last mentioned local circuits being in shunt relation with respect to the first mentioned local circuits, the auxiliary relays being less sensitive than the corresponding repeating transmitter and line relays.

13. A telegraph repeater comprising a repeating transmitter and a line relay for each of a plurality of main line circuits, in combination with an auxiliary relay corresponding to each transmitter, and local circuits, and a source of current supply therefor, including each auxiliary relay in circuit with the magnet of the corresponding transmitter, each auxiliary relay arranged in one position of its armature to divert, through a local circuit controlled by the contacts of the corresponding main line relay, current from the magnets of the opposite auxiliary relay and repeating transmitter.

14. A telegraph repeater comprising a repeating transmitter and a line relay for each of a plurality of main line circuits, in combination with an auxiliary relay corresponding to each transmitter, and local circuits, and a source of current supply therefor, including each auxiliary relay in circuit with the magnet of the corresponding transmitter, each auxiliary relay arranged in one position of its armature to divert, through a local circuit controlled by the contacts of the corresponding main line relay, current from the magnets of the opposite auxiliary relay and repeating transmitter, the auxiliary relays being less sensitive than the corresponding repeating transmitter and line relays.

15. A telegraph repeater comprising a repeating transmitter and a line relay for each of a plurality of main line circuits, in combination with an auxiliary relay corresponding to each transmitter, and local circuits, and a source of current supply therefor, including each auxiliary relay in circuit with the magnet of the corresponding transmitter, each auxiliary relay arranged in one position of its armature to divert, through a local circuit controlled by back contacts of the corresponding main line relay, current from the magnets of the opposite auxiliary relay and repeating transmitter.

16. A telegraph repeater comprising a repeating transmitter and a line relay for each of a plurality of main line circuits, in combination with an auxiliary relay corresponding to each transmitter, and local circuits, and a source of current supply therefor, including each auxiliary relay in circuit with the magnet of the corresponding transmitter, each auxiliary relay arranged in one position of its armature to divert, through a local circuit controlled by back contacts of the corresponding main line relay, current from the magnets of the opposite auxiliary relay and repeating transmitter, the auxiliary relays being less sensitive than the corresponding repeating transmitter and line relays.

17. A telegraph repeater comprising a repeating transmitter and a line relay for each of a plurality of main line circuits, in combination with an auxiliary relay corresponding to each transmitter, and local circuits whereby each main line relay controls the transmitter and auxiliary relay of the opposite line, said local circuits including a source of current supply, and including the magnet of each auxiliary relay in circuit with the magnet of the corresponding repeating transmitter, said local circuits also including a shunt around the magnet of each auxiliary relay and the corresponding repeating transmitter, each such shunt controlled by contacts of the opposite auxiliary relay, each auxiliary relay arranged to maintain continuity of the incoming line at the contact points of the transmitter for that line by opening the shunt around the magnet of that transmitter.

18. A telegraph repeater comprising a repeating transmitter and a line relay for each of a plurality of main line circuits, in combination with an auxiliary relay corresponding to each transmitter, and local circuits whereby each main line relay controls the transmitter and auxiliary relay of the opposite line, said local circuits including a source of current supply, and including the magnet of each auxiliary relay in circuit with the magnet of the corresponding repeating transmitter, said local circuits also including a shunt around the magnet of each auxiliary relay and the corresponding repeating transmitter, each such shunt controlled by contacts of the opposite auxiliary relay, each auxiliary relay arranged to maintain continuity of the incoming line at the contact points of the transmitter for that line by opening the shunt around the magnet of that transmitter, the auxiliary relays being less sensitive than the corresponding repeating transmitters and line relays.

19. A telegraph repeater comprising a repeating transmitter and a line relay for each of a plurality of main line circuits, in combination with an auxiliary relay corresponding to each transmitter, and local circuits including controlling circuits passing through back contacts of the main line relays, whereby each main line relay controls the transmitter and auxiliary relay of the opposite line, said local circuits including a source of current supply, and including the magnet of each auxiliary relay in circuit with the magnet of the corresponding repeating transmitter, said local circuits also including a shunt around the magnet of each auxiliary relay and the corresponding repeating transmitter, each such shunt controlled by contacts of the opposite auxiliary relay, each auxiliary relay arranged to maintain continuity of the incoming line at the contact points of the transmitter for that line by opening the shunt around the magnet of that transmitter.

20. A telegraph repeater comprising a repeating transmitter and a line relay for each of a plurality of main line circuits, in combination with an auxiliary relay corresponding to each transmitter, and local circuits including controlling circuits passing through back contacts of the main line relays, whereby each main line relay controls the transmitter and auxiliary relay of the opposite line, said local circuits including a source of current supply, and including the magnet of each auxiliary relay in circuit with the magnet of the corresponding repeating transmitter, said local circuits also including a shunt around the magnet of each auxiliary relay and the corresponding repeating transmitter, each such shunt controlled by contacts of the opposite auxiliary relay, each auxiliary relay arranged to maintain continuity of the incoming line at the contact points of the transmitter for that line by opening the shunt around the magnet of that transmitter, the auxiliary relays being less sensitive than the corresponding repeating transmitters and line relays.

21. A telegraph repeater comprising a repeating transmitter and a line relay for each of a plurality of main line circuits, in combination with an auxiliary relay corresponding to each transmitter, a source of current supply for local circuits, a local circuit for the magnets of each transmitter and corresponding auxiliary relay connected to said source of supply and including resistance in addition to the magnets of said relays, and a shunt branch from each such local magnet circuit connected to such magnet circuit between the said magnets and the said resistance and passing through contacts of the opposite auxiliary relay and opposite line relay.

22. A telegraph repeater comprising a repeating transmitter and a line relay for each of a plurality of main line circuits, in combination with an auxiliary relay corresponding to each transmitter, a source of current supply for local circuits, a local circuit for the magnets of each transmitter and corresponding auxiliary relay connected to said source of supply and including resistance in addition to the magnets of said relays, and a shunt branch from each such local magnet circuit connected to such magnet circuit between the said magnets and the said resistance, and passing through front contacts of the opposite auxiliary relay and through rear contacts of the opposite line relay.

23. A telegraph repeater comprising a repeating transmitter and a line relay for each of a plurality of main line circuits, in combination with an auxiliary relay corresponding to each transmitter, a source of current supply for local circuits, a local circuit for the magnets of each transmitter and corresponding auxiliary relay connected to said source of supply and including resistance in addition to the magnets of said relays, and a shunt branch from each such local magnet circuit connected to such magnet circuit between the said magnets and the said resistance, and passing through contacts of the opposite auxiliary relay and opposite line relay, said local magnet circuits also including, between the magnets and the said shunt connections, additional resistance giving such local magnet circuits low time constants.

24. A telegraph repeater comprising a repeating transmitter and a line relay for each of a plurality of main line circuits, in combination with an auxiliary relay corresponding to each transmitter, a source of current supply for local circuits, a local circuit for the magnets of each transmitter and corresponding auxiliary relay connected to said source of supply and including resistance in addition to the magnets of said relays, and a shunt branch from each such local magnet circuit connected to such magnet circuit between the said magnets and the said resistance, and passing through front contacts of the opposite auxiliary relay and through rear contacts of the opposite line relay, said local magnet circuits also including, between the magnets and the said shunt connections, additional resistance giving such local magnet circuits low time constants.

In testimony whereof I have signed this specification in the presence of two subscribing witnesses.

WILLIAM FINN.

Witnesses:
P. T. MacNamara,
H. W. Drake.